US012681155B2

(12) United States Patent
Yeh et al.

(10) Patent No.: US 12,681,155 B2
(45) Date of Patent: Jul. 14, 2026

(54) ULTRASOUND PROCESSING SYSTEM, TRANSCEIVER CIRCUIT, AND METHOD RELATED TO BEAMFORMING

(71) Applicant: Leltek Inc., New Taipei City (TW)

(72) Inventors: Biyun Yeh, Taipei City (TW); Sheng-Chang Peng, Taipei City (TW); Jui-Yuan Tsai, Hsinchu City (TW); Kuo-Ping Liu, Taipei City (TW)

(73) Assignee: Leltek Inc., New Taipei City (TW)

( * ) Notice: Subject to any disclaimer, the term of this patent is extended or adjusted under 35 U.S.C. 154(b) by 175 days.

(21) Appl. No.: 18/656,607

(22) Filed: May 7, 2024

(65) Prior Publication Data

US 2025/0347790 A1      Nov. 13, 2025

(51) Int. Cl.
*G01S 15/89* (2006.01)
*G01S 7/52* (2006.01)
(52) U.S. Cl.
CPC ...... *G01S 7/52095* (2013.01); *G01S 15/8915* (2013.01)
(58) Field of Classification Search
CPC .......................... G01S 7/52095; G01S 15/8915
See application file for complete search history.

(56) References Cited

U.S. PATENT DOCUMENTS

2024/0345233 A1* 10/2024 Üstüner .............. G01S 7/52022

* cited by examiner

*Primary Examiner* — Krystine E Breier
(74) *Attorney, Agent, or Firm* — JCIPRNET

(57)      ABSTRACT

An ultrasound processing system, a transceiver circuit, and a method related to beamforming are provided. The ultrasound processing system includes a transceiver circuit. The transceiver circuit includes one or several delay calculators. Each delay calculator is configured with a beamline initial location, a receiving ultrasound element location, and a steering angle and is configured to determine location information according to the beamline initial location, the receiving ultrasound element location, and the steering angle. The beamline initial location is the location of beamline on a baseline. The receiving ultrasound element location is the location of receiving an echo of the ultrasound signal on one transducer element. The steering angle is an angle relationship related to the beamline and the baseline. The location information includes the location of points on the beamline and the distance from these points to the receiving ultrasound element location.

12 Claims, 5 Drawing Sheets clk

Init, bf_enable (xb, yb)

-sin(theta), -cos(theta)

(xen, yen)

delay calculator

Ln(t)

31

Providing a transceiver circuit

S510

Being configured with a beamline initial location, a receiving ultrasound element location, and a steering angle

S520

Determining the location information according to the beamline initial location, the receiving ultrasound element location, and the steering angle

S530

ULTRASOUND PROCESSING SYSTEM, TRANSCEIVER CIRCUIT, AND METHOD RELATED TO BEAMFORMING

BACKGROUND

Technical Field

The present disclosure generally relates to an ultrasound processing system, a transceiver circuit, and a method related to beamforming.

Description of Related Art

Ultrasound images are generated by using the beamforming algorithm to convert the data into a grayscale image after receiving the ultrasound echo. The beamforming algorithm requires a large number of calculations of distances between points, and an accurate calculation result would affect the quality of the ultrasound image. In general, the software may perform the calculations of distances between points. However, it may take a long time to write the results of the calculations into memory.

SUMMARY

Accordingly, the present disclosure is directed to an ultrasound processing system, a transceiver circuit, and a method related to beamforming.

According to one or more exemplary embodiments of the disclosure, an ultrasound processing system includes a transceiver circuit. The transceiver circuit includes one or several delay calculators. Each delay calculator is configured with a beamline initial location, a receiving ultrasound element location, and a steering angle. It is configured to determine the location of points on the beamline and the distance from a point of the beamline to the receiving ultrasound element location. The beamline initial location could be any place on the baseline which is formed by the transducer elements but is not limited thereto. The receiving ultrasound element location is the location of receiving an echo of the ultrasound signal on one of the transducer elements. The steering angle is information about the angle relationship related to the beamline and the baseline. The location of any point on the beamline is determined by the beamline initial location and the steering angle. The steering angle may be different from or the same as an ultrasound emitting angle which is an angle of emitting the ultrasound signal. The delay calculator is configured to output the information of the distance between the receiving ultrasound element location and one location of a point on the beamline at a time corresponding to the beamline initial location, the steering angle and a built-in counter.

According to one or more exemplary embodiments of the disclosure, a transceiver circuit includes one or several delay calculators. Each delay calculator is configured with the beamline initial location, a receiving ultrasound element location, and a steering angle, and is configured to determine the delay information according to the beamline initial location, the receiving ultrasound element location, and the steering angle. The beamline initial location is the location of the starting point of a beamline. The receiving ultrasound element location is the location of receiving an echo of the ultrasound signal on one of the transducer elements. The steering angle is the angle of beamline direction. The delay information is the time that the echo of the ultrasound signal travels from a point of the beamline to the receiving element.

It could be derived from the sound speed and the distance between the receiving ultrasound element location to the location of the point on the beamline.

According to one or more exemplary embodiments of the disclosure, a method related to beamforming includes the following steps. A transceiver circuit is provided. The transceiver circuit includes one or several delay calculators. Each delay calculator is configured with the beamline initial location, the receiving ultrasound element location, and the steering angle. The beamline initial location is a starting location of a beamline and could be any place on the baseline formed by the transducer elements. The receiving ultrasound element location is the location of receiving an echo of the ultrasound signal on one of the transducer elements. The steering angle is the information of beamline direction. The location information is determined according to the beamline initial location and the steering angle through the delay calculator. The delay information includes the distance between the receiving ultrasound element location and the location of a point on the beamline corresponding to the beamline initial location and the steering angle.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
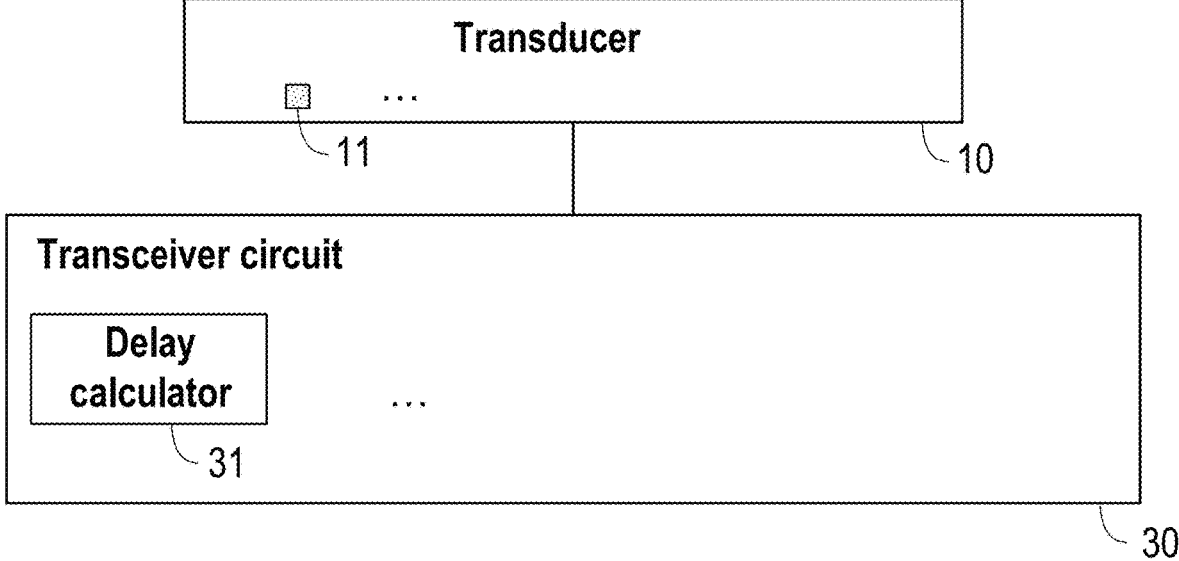
FIG. 1 is a block diagram that illustrates an ultrasound processing system according to an exemplary embodiment of the present disclosure.

FIG. 1 is a block diagram that illustrates an ultrasound processing system 1 according to an exemplary embodiment of the present disclosure. Referring to FIG. 1, the ultrasound processing system 1 includes, but is not limited to, a transducer 10 and a transceiver circuit 30. The ultrasound processing system 1 could be implemented as examination equipment, ultrasound scan equipment, a computer, a laptop, a server, a handheld device, or other electronic device.

The transducer 10 includes one or more transducer elements 11. In one embodiment, multiple transducer elements 11 are arranged in a line. The line could be straight, curved, or other shapes. In one embodiment, the transducer element 11 is used to transmit ultrasound signals/waves and/or receive echos of the ultrasound signals. The echo is generated in response to an ultrasound signal arriving at an object (such as tissue, bone, or organ) and being reflected by the object.

The transceiver circuit 30 is coupled to the transducer 10. The transceiver circuit 30 includes one or more delay calculator 31.

The delay calculator 31 could be a programmable general-purpose or special-purpose microprocessor, a digital signal processor (DSP), a programmable controller, a field programmable gate array (FPGA), an application-specific integrated circuit (ASIC), other digital circuits, other similar components, or combinations of components thereof.

Figure 2:
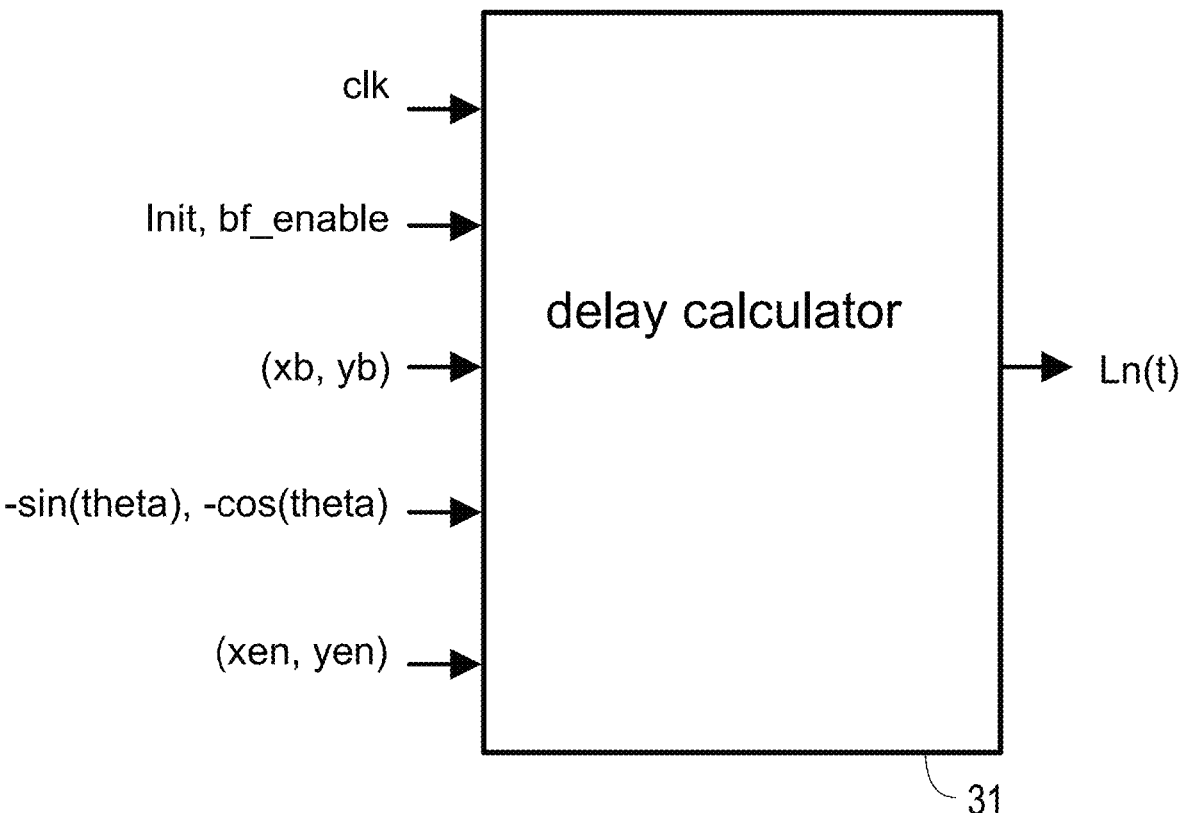
FIG. 2 is a schematic diagram that illustrates a delay calculator according to an exemplary embodiment of the present disclosure.

FIG. 2 is a schematic diagram that illustrates a delay calculator 31 according to an exemplary embodiment of the present disclosure. Referring to FIG. 2, the delay calculator 31 is configured to input and configure clock signal clk, initial parameter init or enable signal bf_enable, a beamline initial location (which is represented by, for example, coordinate (xb, yb) at two dimensions) of a beamline, an angle-related parameter (which is represented by, for example, triangle functions −sin (theta) and −cos (theta)), and a receiving ultrasound element location (which is represented by, for example, coordinate (xen, yen) at two dimensions).

The clock signal clk could be a local oscillation signal provided by an oscillator (not shown) or other clock signals. In one embodiment, the clock signal clk is used to synchronize with a procedure or behavior, such as switching, initializing, or terminating.

The initial parameter init could be used for the subsequent calculation. For example, the initial parameter init could be the distance of a line between the beamline initial location (e.g., the coordinate (xb, yb)) of the beamline and the receiving ultrasound element location (e.g., the coordinate (xen, yen)).

The enable signal bf_enable is used to trigger the operation of the delay calculator 31. For example, when (or only when) the enable signal bf_enable is set as "1", the delay calculator 31 calculates based on the aforementioned parameters or signals and outputs the calculated result. When (or only when) the enable signal bf_enable is set as "0", the delay calculator 31 stops the calculation.

Figure 3:
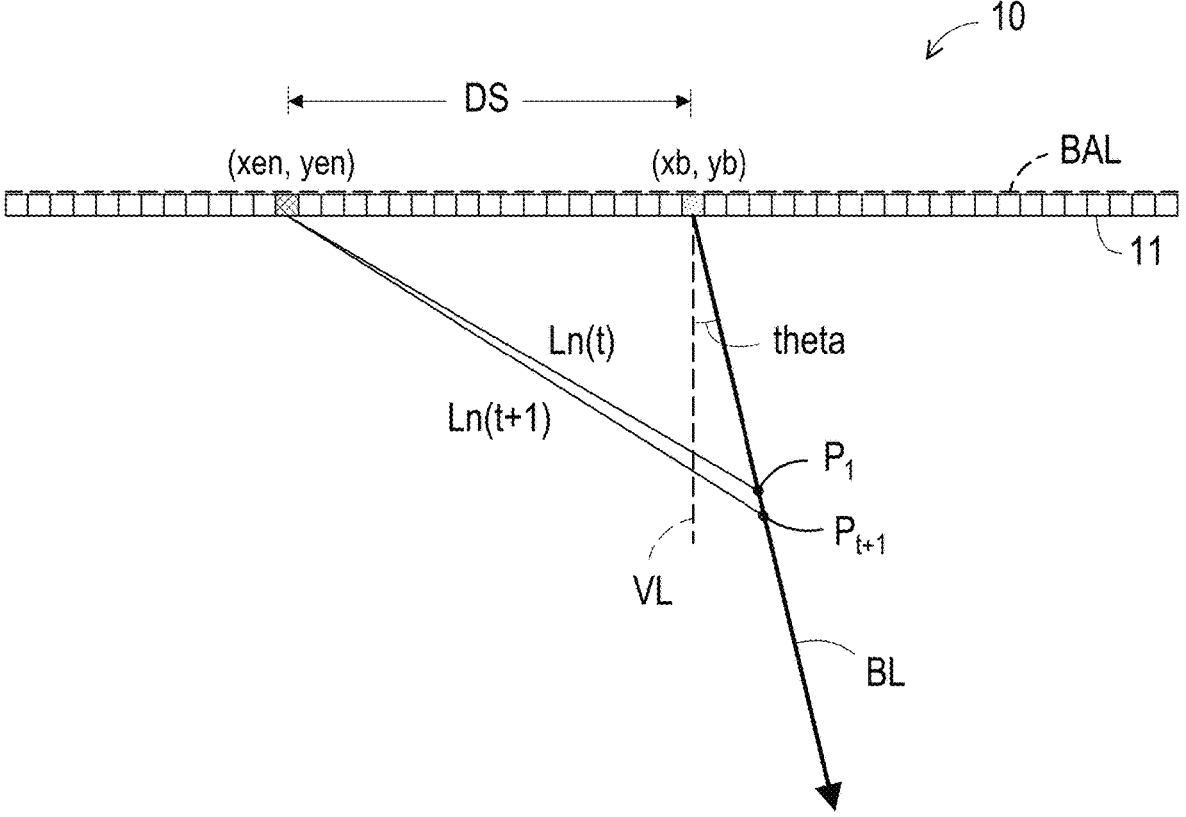
FIG. 3 is a schematic diagram that illustrates location information according to an exemplary embodiment of the present disclosure.

The beamline initial location (e.g., coordinate (xb, yb)) of the beamline is the starting location of the beamline. However, in some embodiments, the beamline initial location could be any place on the baseline. The baseline may be formed by the transducer elements 11, but it is not limited thereto. The beamline refers to, when imaging, an image may be composed of, for example, 128 or 256 or more lines, and one of these lines is the beamline. In one embodiment, the baseline is a line passing through the transducer elements 11 in order. In other words, the baseline is an imaginary line that overlaps with the transducer elements 11. For example, FIG. 3 is a schematic diagram that illustrates location information according to an exemplary embodiment of the present disclosure. However, in other embodiments, the baseline may not pass through one of the transducer elements 11 or multiple transducer elements 11. Referring to FIG. 3, a beamline BL corresponds to one or more ultrasound signals/waves/beams. The ultrasound signals/waves/beams travel along a preferred direction called the steering angle theta (i.e., θ). The transceiver circuit 30 may include one or more transmitting circuits (not shown) to emit the ultrasound signals/waves/beams. The steering angle theta is an angle relationship related to the beamline BL and the vertical line VL of the baseline BAL, for example, the angle between the beamline BL and the baseline BAL or the angle of emitting the ultrasound signal/wave/beam (i.e., the ultrasound emitting angle). In one embodiment, the vertical line VL may be interleaved with both the beamline BL and the baseline BAL. In some embodiments, the steering angle may be different from or the same as the ultrasound emitting angle which is an angle of emitting the ultrasound signal. The beamline initial location of the beamline BL is located at the baseline BAL overlapped with the transducer element 11 for example but not limited thereto. As shown in FIG. 3, multiple transducer elements 11 are arranged in a line along the baseline BAL. Each transducer element 11 may be assigned with a coordinate. For example, the value yb of the coordinate in the vertical axis could be set as "0", and the value xb of the coordinate in the horizontal axis could be set from "−m/2 to m/2−1" based on the order of the transducer elements 11, where m is the number of the transducer elements 11.

It should be noted that based on the actual requirement, such as higher resolution, the beamline initial location may be not located at one of the transducer elements 11 and may be located between two neighboring transducer elements 11.

The angle-related parameter is one or more parameters related to the steering angle (e.g., steering angle theta in FIG. 3). For example, the angle-related parameter could be the triangle functions −sin (theta) and −cos (theta). For another example, the angle-related parameter could be steering angle theta.

The receiving ultrasound element location (e.g., coordinate (xen, yen)) is the location of receiving an echo signal/wave of the ultrasound signal/wave/beam. The transceiver circuit 30 may include one or more receiving circuits (not shown) to receive the echo signal/wave of the ultrasound signals/waves/beams. Taking FIG. 3 as an example, the value yen of the coordinate in the vertical axis could be set as "0", and the value of the coordinate in the horizontal axis could be set from "−m/2 to m/2−1" based on the order of the transducer elements 11, where m is the number of the transducer elements 11.

In one embodiment, the delay calculator 31 determines location information according to the beamline initial location, the receiving ultrasound element location, and the steering angle. The location information includes the location of a point or any point on a beamline and the distance between these points and the receiving ultrasound element location. The location of the point on the beamline is determined according to the beamline initial location and the steering angle. The delay calculator 31 is configured to output the information of the distance between the receiving ultrasound element location and one location of a point on the beamline at a time corresponding to the beamline initial location, the steering angle, and a built-in counter (not shown). The built-in counter determines the timing of outputting the location information.

Taking FIG. 3 as an example, the location information includes, at the time t, the distance Ln (t) between the receiving ultrasound element location (e.g., coordinate (xen, yen)) and the location of point $P_t$ on the beamline BL corresponding to the beamline initial location (e.g., coordinate (xb, yb)) and the steering angle theta. At the time t, the delay calculator 31 may know the location of point $P_t$ on the beamline BL and output the distance Ln (t).

The location information may further include, at the time t+1, the distance Ln (t+1) between the receiving ultrasound element location (e.g., coordinate (xen, yen)) and the location of point $P_{t+1}$ on the beamline BL corresponding to the beamline initial location (e.g., coordinate (xb, yb)) and the steering angle theta. At the time t+1, the delay calculator 31 may know the location of point $P_{t+1}$ on the beamline BL and output the distance Ln (t+1). The location information may further include the distance between the receiving ultrasound element location (e.g., coordinate (xen, yen)) and the location of the point on the beamline BL at other times.

Referring to FIG. 3, in one embodiment, the beamline BL corresponding to the beamline initial location (e.g., coordinate (xb, yb)) and the steering angle theta, the steering angle theta, and the line between the beamline initial location (e.g., coordinate (xb, yb)) and the receiving ultrasound element location (e.g., coordinate (xen, yen)) form a reference triangle. The reference triangle has three sides, which are the side between the beamline initial location (e.g., coordinate (xb, yb)) and the receiving ultrasound element location (e.g., coordinate (xen, yen)), the side between the beamline initial location (e.g., coordinate (xb, yb)) of the beamline BL and the location of the point $P_t$ on the beamline BL, and the side between the receiving ultrasound element location (e.g., coordinate (xen, yen)) and the location of the point $P_t$ on the beamline BL.

The delay calculator 31 may determine the distance Ln (t) between the receiving ultrasound element location (e.g., coordinate (xen, yen)) and the location of the point $P_t$ on the beamline BL corresponding to the beamline initial location (e.g., coordinate (xb, yb)) and the steering angle theta according to the reference triangle. The value/length of the distance DS between the beamline initial location (e.g., coordinate (xb, yb)) and the receiving ultrasound element location (e.g., coordinate (xen, yen)) could be configured from, for example, the beamline initial parameter init. Assumed that the spacing between two adjacent transducer elements 11 is known. The value/length of the distance Ln (t) between the receiving ultrasound element location (e.g., coordinate (xen, yen)) and the location of the point $P_t$ on the beamline BL could be determined based on the distance DS, the steering angle theta, and the spacing between two adjacent transducer elements 11 in the reference triangle based on the triangle functions such as –sin (theta) and –cos (theta). Also, the value/length of the distance Ln (t+1) between the receiving ultrasound element location (e.g., coordinate (xen, yen)) and the location (for example, as shown at the symbol "t+1") on the beamline BL or other values/lengths of the distances corresponding to other sampling times could be determined. That is the delay calculator is programmed/configured with a function or an algorithm to determine the value/length of the distance Ln (t), Ln (t+1) between the receiving ultrasound element location (e.g., coordinate (xen, yen)) and the location of the point $P_t$, point $P_{t+1}$, or any other point on the beamline BL based on the triangle functions. Then, the delay calculator 31 may output the distance Ln (t) as shown in FIG. 2.

In one embodiment, the delay calculator 31 may output the distance Ln (t+1) or the distance corresponding to another sampling time.

In one embodiment, when (or only when) the enable signal bf_enable as shown in FIG. 2 is set as "1" or another value indicating enablement, the delay calculator 31 calculates and outputs the aforementioned calculated result (e.g., the distance Ln (t)). When (or only when) the enable signal bf_enable is set as "0" or another value indicating disablement, the delay calculator 31 stops the calculation.

In one embodiment, the delay calculator 31 may determine delay information according to the beamline initial location, the receiving ultrasound element location, and the steering angle. The beamline initial location is the location of the starting point of a beamline. Taking FIG. 3 as an example, the coordinate (xb, yb) on the transducer elements 11 is the beamline initial location where the starting point of the beamline BL. Alternatively, the beamline initial location may be any place on the baseline. The delay information is the time that the echo of the ultrasound signal travels from a point of the beamline to the receiving element. The time or the delay information could be derived from the sound speed and the distance between the receiving ultrasound element location to the location of the point on the beamline. For example, the time is derived from dividing the distance between the receiving ultrasound element location to the location of the point on the beamline by the sound speed. The receiving element is one transducer element 11 which receives the echo of the ultrasound signal.

Figure 4:
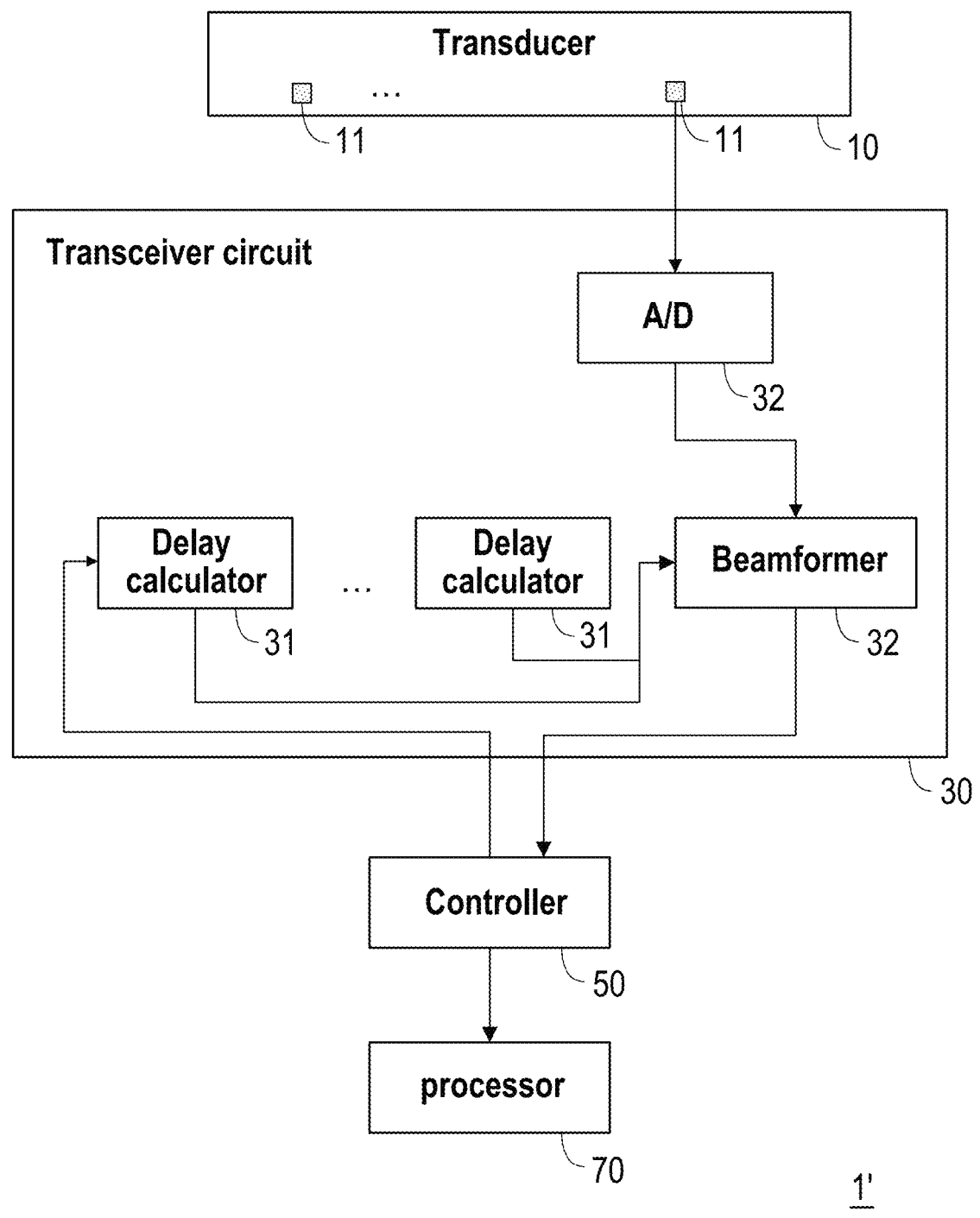
FIG. 4 is a block diagram that illustrates an ultrasound processing system according to an exemplary embodiment of the present disclosure.

FIG. 4 is a block diagram that illustrates an ultrasound processing system 1' according to an exemplary embodiment of the present disclosure. Referring to FIG. 4, the ultrasound processing system 1' includes, but is not limited to, a transducer 10, a transceiver circuit 30, a controller 50, and a processor 70.

The transducer 10 includes multiple transducer elements 11. The description of the transducer 10 and the transducer elements 11 could refer to the description of the transducer 10 and the transducer elements 11 in FIG. 1.

The transceiver circuit 30 includes, but is not limited to, multiple delay calculators 31, one or more analog-to-digital (A/D) converters 32, and one or more beamformers 33.

The description of the delay calculator 31 could refer to the description of the delay calculator 31 in FIG. 1 to FIG. 3. In one embodiment, each delay calculator 31 corresponds to one of the transducer elements 11 and one of the beamlines (such as the beamline BL as shown in FIG. 3). For example, in a 64-channel receiver structure (which may include 64 receiving circuits), if four beamlines are generated, there would be 64*4 (=256) delay calculators 31. These delay calculators 31 may calculate the distance between the receiving ultrasound element location and the location on the four beamlines at the same time, so as to generate 256 values of the distances in parallel. For another example, if 256 delay calculators 31 are configured in the transceiver circuit 30, the distances for eight beamlines could be determined at the same time in a 32-channel receiver structure (which may include 64 receiving circuits).

The analog-to-digital converter 32 (included in the receiving circuit (not shown)) is coupled to the transducer 10. The analog-to-digital converter 32 is used to convert the echo from an analog signal into a digital signal.

The beamformers 33 is coupled to one or more delay calculators 31 and the analog-to-digital converter 32. The beamformers 33 could be a programmable general-purpose or special-purpose microprocessor, a digital signal processor (DSP), a programmable controller, a field programmable gate array (FPGA), an application-specific integrated circuit (ASIC), other digital circuits, other similar components, or combinations of components thereof.

In one embodiment, the beamformer 33 is programmed or configured to determine beamforming data according to the location information outputted from the delay calculator through a delay and sum calculation. The delay and sum calculation is one of the calculations of the beamforming algorithm. For example, the beamformer 33 performs time delaying on the echo in digital form, for example, after ADC, and summing the delayed echo signal. The beamforming data includes the result of the summation. The beamforming data may include the result of the summation corresponding to multiple points on the beamline based on the requirement of depth. Furthermore, the location information, for example, the distance Ln (t) as shown in FIG. 3, is used to determine the amount of delay time for one echo.

In one embodiment, the location information, for example, the distance Ln (t) as shown in FIG. 3, is used to determine the distance between the transducer element 11 and an object. The beamforming data may include the distance of an object.

The controller 50 is coupled to the beamformer 32 and the delay calculator 31. The controller 50 could be a programmable general-purpose or special-purpose microprocessor, a digital signal processor (DSP), a programmable controller, a field programmable gate array (FPGA), an application-specific integrated circuit (ASIC), other digital circuits, other similar components, or combinations of components thereof.

In one embodiment, the controller 50 is programmed or configured to generate an ultrasound image according to the beamforming data outputted from the beamformer 32. For example, the controller 50 combines multiple beamforming data corresponding to multiple scan lines.

In one embodiment, the controller 50 is used to compress the ultrasound image.

In one embodiment, the controller 50 is used to control the operations of beamforming.

The processor 70 is coupled to the controller 50. The processor 70 could be a central processing unit (CPU), a graphics processing unit (GPU), a programmable general-purpose or special-purpose microprocessor, a digital signal processor (DSP), a programmable controller, a field programmable gate array (FPGA), an application-specific integrated circuit (ASIC), other digital circuits, other similar components, or combinations of components thereof. In one embodiment, the processor 70 is used to display the ultrasound image on a display (not shown).

Figure 5:
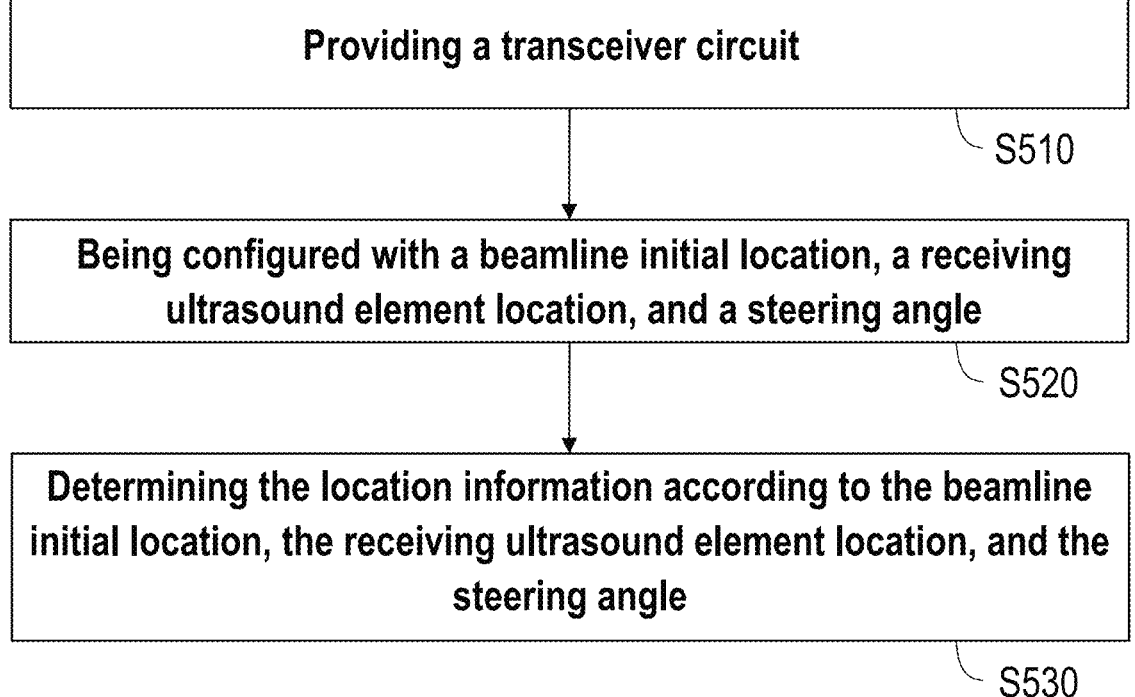
FIG. 5 is a flow chart that illustrates a method related to beamforming according to an exemplary embodiment of the present disclosure.

FIG. 5 is a flow chart that illustrates a method related to beamforming according to an exemplary embodiment of the present disclosure. Referring to FIG. 5, a transceiver circuit is provided (step S510). For example, the transceiver circuit 30 is shown in FIG. 1 and/or FIG. 4. The transceiver circuit includes one or more delay calculators. For example, the delay calculator is shown in FIG. 1, FIG. 2, and/or FIG. 4. The delay calculator A is configured with a beamline initial location, a receiving ultrasound element location, and a steering angle (step S520). For example, the coordinates (xb, yb) and (xen, yen) and the triangle functions −sin (theta) and −cos (theta) are inputted into the delay calculator 31 as shown in FIG. 2. The location information is determined according to the beamline initial location of the beamline, the receiving ultrasound element location, and the steering angle through the delay calculator (step S530). For example, the distance Ln (t) is outputted from the delay calculator 31 as shown in FIG. 2.

In one embodiment, the beamline, the steering angle, and the line between the beamline initial location and the receiving ultrasound element location form a reference triangle. The distance between the receiving ultrasound element location and the location of a point on the beamline corresponding to the beamline initial location and the steering angle is determined according to the reference triangle.

In one embodiment, multiple delay calculators are provided. Each delay calculator corresponds to one of the transducer elements and one of the beamlines.

In one embodiment, beamforming data is determined through the delay calculator according to the location information through a delay and sum calculation.

In one embodiment, a controller configured to generate an ultrasound image according to the beamforming data is provided. For example, the controller 50 is shown in FIG. 4.

The implementation details of each step in FIG. 5 have been explained in detail in the above embodiments and implementation methods, and will not be repeated. In addition to being implemented in the form of a circuit, the steps and implementation details of the embodiments of the disclosure may also be implemented by a processor in the form of software, and the embodiments of the disclosure are not limited thereto.

In summary, according to the ultrasound processing system, the transceiver circuit, and the method related to beamforming, one or more delay calculators are provided in a transceiving circuit, and the delay calculator may determine the distance between the transducer element and a point located on a beamline. Therefore, the distance needed by the beamforming would be determined by hardware, less storage would be needed for storing the distance, the computing loading could be reduced on software, the power could be saved, and the efficiency of beamforming calculation could be improved.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An ultrasound processing system, comprising:
a transducer, comprising transducer elements; and
a transceiver circuit, comprising:
  a delay calculator, configured to:
    be configured with a beamline initial location, a receiving ultrasound element location, and an angle-related parameter, wherein the beamline initial location is a location of a beamline on a baseline, the receiving ultrasound element location is a location of receiving an echo of an ultrasound signal on one of the transducer elements, and the angle-related parameter comprises a triangle function which includes a sine function and a cosine function of a steering angle;
    determine location information according to the beamline initial location, the receiving ultrasound element location, and the angle-related parameter, wherein the location information comprises a distance between the receiving ultrasound element location and a location of a point on the beamline, and the location of the point on the beamline is determined according to the beamline initial location and the angle-related parameter; and
    output the location information comprising the distance between the receiving ultrasound element location and the location of the point on the beamline at a timing determined by a built-in counter,
  wherein the beamline, the steering angle, and a line between the beamline initial location and the receiving ultrasound element location form a reference triangle, and the delay calculator is further configured to:
    determine the distance between the receiving ultrasound element location and the location of the point on the beamline corresponding to the beamline initial location and the steering angle according to the reference triangle, wherein the reference triangle comprises a first side formed between the beamline initial location and the receiving ultrasound element location, a second side formed between the beamline initial location of the beamline and the location of the point on the beamline, and a third side formed between the receiving ultrasound element location and the location of the point on the beamline.

2. The ultrasound processing system of claim 1, further comprising:
a plurality of the delay calculators, wherein each one of the plurality of the delay calculators corresponds to one of the transducer elements and one of the beamlines.

3. The ultrasound processing system of claim 1, wherein the transceiver circuit further comprises:
a beamformer, coupled to the delay calculator and configured to:
determine beamforming data according to the location information through a delay and sum calculation.

4. The ultrasound processing system of claim 3, further comprising:
a controller, coupled to the beamformer and configured to:
generate an ultrasound image according to the beamforming data.

5. A transceiver circuit, comprising:
a delay calculator, configured to:
be configured with a beamline initial location, a receiving ultrasound element location, and a an angle-related parameter, wherein the beamline initial location is a location of a beamline on a baseline, the receiving ultrasound element location is a location of receiving an echo of an ultrasound signal on one of transducer elements, and the angle-related parameter comprises a triangle function which includes a sine function and a cosine function of a steering angle; and
determine location information according to the beamline initial location, the receiving ultrasound element location, and the angle-related parameter, wherein the location information comprises a distance between the receiving ultrasound element location and a location of a point on the beamline, and the location of the point on the beamline is determined according to the beamline initial location and the angle-related parameter; and
output the location information comprising the distance between the receiving ultrasound element location and the location of the point on the beamline at a timing determined by a built-in counter,
wherein the beamline, the steering angle, and a line between the beamline initial location and the receiving ultrasound element location form a reference triangle, and the delay calculator is further configured to:
determine the distance between the receiving ultrasound element location and the location of the point on the beamline corresponding to the beamline initial location and the steering angle according to the reference triangle,
wherein the reference triangle comprises a first side formed between the beamline initial location and the receiving ultrasound element location, a second side formed between the beamline initial location of the beamline and the location of the point on the beamline, and a third side formed between the receiving ultrasound element location and the location of the point on the beamline.

6. The transceiver circuit of claim 5, further comprising:
a beamformer, coupled to the delay calculator and configured to:
determine beamforming data according to the location information through a delay and sum calculation.

7. The transceiver circuit of claim 6, wherein the beamformer is further configured to:
outputting the beamforming data, to generate an ultrasound image according to the beamforming data.

8. The transceiver circuit of claim 5, further comprising:
an analog-to-digital converter, configured to convert the echo into a digital signal.

9. A method related to beamforming, comprising:
providing a transceiver circuit, wherein the transceiver circuit comprises a delay calculator;
configuring the delay calculator with a beamline initial location, a receiving ultrasound element location, and an angle-related parameter, wherein the beamline initial location is a location of a beamline on a baseline, the receiving ultrasound element location is a location of receiving an echo of an ultrasound signal on one of transducer elements, and the angle-related parameter comprises a triangle function which includes a sine function and a cosine function of a steering angle; and
determining, through the delay calculator, location information according to the beamline initial location, the receiving ultrasound element location, and the angle-related parameter, wherein the location information comprises a distance between the receiving ultrasound element location and a location of a point on the beamline, and the location of the point on the beamline is determined according to the beamline initial location and the angle-related parameter;
outputting the location information comprising the distance between the receiving ultrasound element location and the location of the point on the beamline at a timing determined by a built-in counter,
wherein the beamline, the steering angle, and a line between the beamline initial location and the receiving ultrasound element location form a reference triangle, and determining location information comprises:
determining the distance between the receiving ultrasound element location and the location of the point on the beamline corresponding to the beamline initial location and the steering angle according to the reference triangle, wherein the reference triangle comprises a first side formed between the beamline initial location and the receiving ultrasound element location, a second side formed between the beamline initial location of the beamline and the location of the point on the beamline, and a third side formed between the receiving ultrasound element location and the location of the point on the beamline.

10. The method of claim 9, further comprising:
providing a plurality of the delay calculators, wherein each one of the plurality of the delay calculators corresponds to one of the transducer elements and one of the beamlines.

11. The method of claim 9, wherein the transceiver circuit further comprises a beamformer, and the method further comprises:
determining, through the delay calculator, beamforming data according to the location information through a delay and sum calculation.

12. The method of claim 11, further comprising:

providing a controller configured to generate an ultra-
sound image according to the beamforming data.

\* \* \* \* \*